US 6,667,076 B2

(12) United States Patent
Fried et al.

(10) Patent No.: US 6,667,076 B2
(45) Date of Patent: Dec. 23, 2003

(54) PROCESSES FOR COATING A TEMPERATURE-STABLE COMPONENT WITH A THERMAL PROTECTION LAYER

(75) Inventors: Reinhard Fried, Nussbaumen (CH); Heinz Neuhoff, Waldshut-Tiengen (DE)

(73) Assignee: Alstom (Switzerland) Ltd., Baden (CH)

( * ) Notice: Subject to any disclaimer, the term of this patent is extended or adjusted under 35 U.S.C. 154(b) by 0 days.

(21) Appl. No.: 10/192,501

(22) Filed: Jul. 11, 2002

(65) Prior Publication Data

US 2003/0026952 A1 Feb. 6, 2003

(30) Foreign Application Priority Data

Jul. 11, 2001 (CH) ............................... 1276/01

(51) Int. Cl.$^7$ ................................. C23C 4/12
(52) U.S. Cl. ................ 427/448; 427/453; 427/256; 427/287; 427/421; 29/889.721
(58) Field of Search ................. 427/448, 446, 427/453, 455, 456, 142, 256, 282, 287, 422, 421; 29/889.721

(56) References Cited

U.S. PATENT DOCUMENTS 4,338,360 A    7/1982   Cavanagh et al.
4,402,992 A    9/1983   Liebert
5,512,382 A    4/1996   Strangman
5,960,249 A    9/1999   Ritter et al.
6,077,036 A    6/2000   Heffron et al.
6,171,711 B1   1/2001   Draghi et al.
6,365,013 B1 * 4/2002   Beele ............... 204/192.16

FOREIGN PATENT DOCUMENTS

FR    2680120        2/1993
WO    WO99/23273     5/1999

* cited by examiner

*Primary Examiner*—Katherine A. Bareford
(74) *Attorney, Agent, or Firm*—Adam J. Cermak

(57) ABSTRACT

A process and a device for coating a temperature-stable component with a thermal protection layer (15), in which the temperature-stable component has a surface (12) which is to be coated with the thermal protection layer (15) and at which there is at least one cooling-passage opening (1) which is connected to a cooling passage running inside the component. During the coating a mass flow (10) emerges through the cooling-passage opening (1), the coating takes place by a coating mass flow (11) directed onto the surface (12) which is to be coated, and the mass flow (10) emerges through the cooling-passage opening (1) and the coating mass flow (11) include an angle $\alpha \neq 0°$.

9 Claims, 3 Drawing Sheets

Figure 1:
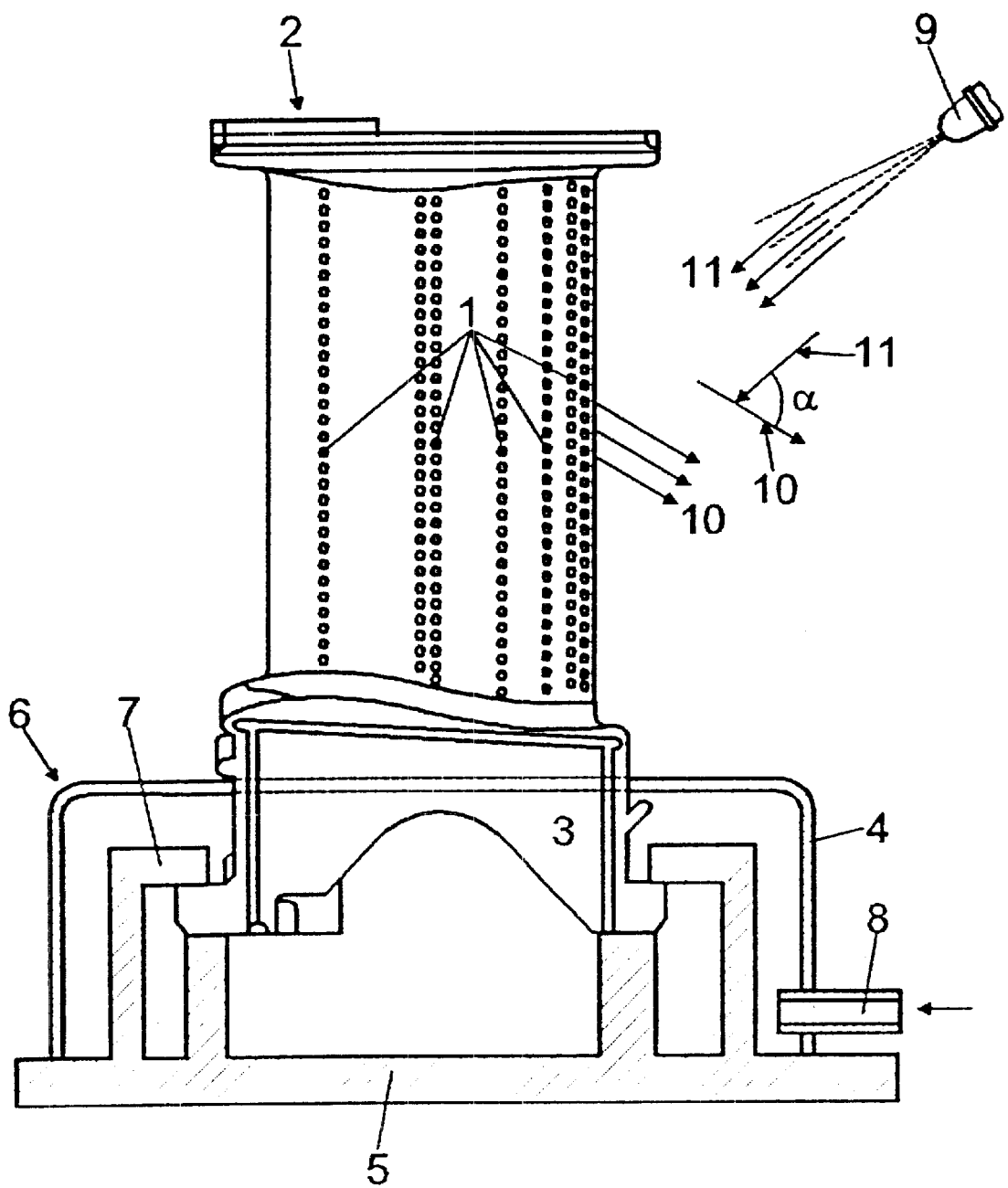

PROCESSES FOR COATING A TEMPERATURE-STABLE COMPONENT WITH A THERMAL PROTECTION LAYER

TECHNICAL FIELD

The invention relates to a process and a device for coating a temperature-stable component with a thermal protection layer, in which the temperature-stable component has a surface which is to be coated with the thermal protection layer and at which there is at least one cooling-passage opening which is connected to a cooling passage running inside the component. The invention also describes a temperature-stable component which can be produced using the above process.

PRIOR ART

Temperature-stable components are designed for use in hot environmental conditions and are substantially characterized by the choice of materials of which they consist. In the discussions which follow, the temperature-stable components considered will be those components of a gas turbine installation which are directly or indirectly exposed to the hot gas flow, such as for example the combustion chamber walls and components which divert the hot gas flow, such as rotor blades and guide vanes within the respective gas turbine stages. Of course, in this context consideration can also be given to other temperature-stable components which are used in other technical fields in which the components are also exposed to high thermal loads.

Temperature-stable components of this type are completely or partially coated, in a manner known per se, with an additional thermal protection layer (TBC=Thermal Barrier Coating), in order to further improve their ability to withstand heat. The use of thermal protection layers has long been known and in conjunction with gas turbine components can be found, inter alia, in the following documents: U.S. Pat. No. 5,960,249, U.S. Pat. No. 5,512,382 and U.S. Pat. No. 6,077,036.

The thermal protection layer is applied, in a manner which is known per se, during a spraying operation, to the surface of the heat-resistant components. The spraying operation is carried out under ambient conditions in standard coating chambers. In this context, thermal flame spraying processes, in which coating material in powder form is heated and melted, are particularly suitable. The drops which are formed are then directed by means of a gaseous carrier jet onto the component surface which is to be coated, where the drops cool and solidify as a layer structure.

If the heat-resistant components to be coated are components which have internal cooling systems which, via cooling-passage openings, open out at the surface of the component in order to further cool their component surface, the coating operation encounters the difficulty that the cooling-passage openings which are present at the component surface which is to be coated should not be closed up. For this reason, the cooling passages which open out at the component surface have hitherto only been introduced into the component after the coating operation, but this entails additional production costs. Alternatively, the cooling-passage openings which are already present in the component surface are covered over in order to protect them from being closed up by the material which is to form the coating, but in particular if there are a large number of cooling-passage openings of this type this has not proven to be a suitable measure.

Highly modern air-cooled guide vanes and rotor blades of a gas turbine have, by way of example, more than 800 cooling-passage openings at their surface, each with a diameter of less than 1 mm. All coating techniques which have been known hitherto and which either make do with subsequent punching through the coating layer or, by suitable measures, make use of covering of the individual cooling-passage openings before the coating, have not proven practical on an industrial scale. The possibility of making the cooling-passage openings larger, in order in this way to prevent the opening from being completely closed up during the coating, have proven to have little prospect of success, since the relatively large cooling-passage openings which have been at least partially blocked as a result of the coating operation, on account of the additional removal of material around the cooling-passage opening, acquire undefined opening structures, which is of considerable detriment to the cooling effect which it is desired to produce by means of the cooling-passage openings.

SUMMARY OF THE INVENTION

The invention is based on the object of further developing a process and a device for coating a temperature-stable component, preferably a gas turbine component, such as for example a guide vane or a rotor blade, with a thermal protection layer, the temperature-stable component having a surface which is to be coated with the thermal protection layer and at which there is at least one cooling-passage opening which is connected to a cooling passage which runs inside the component, in such a manner that, despite the coating operation, the cooling-passage opening is retained with the minimum possible technical and design outlay. The intention is that the surface which is to be coated should be covered with a thermal protection layer of the same quality as that achieved in the prior art. In particular, it is important that the surface-cooling action of the cooling air which emerges from the cooling openings should not be adversely affected and should even be improved.

Furthermore, it is an object of the invention to describe an arrangement with which the process can be carried out with the minimum possible cost and design outlay. The arrangement is in particular to allow temperature-stable components for use on a large industrial scale to be coated.

The process according to the invention for coating a temperature-stable component with a thermal protection layer, in which the temperature-stable component has a surface which is to be coated with the thermal protection layer and at which there is at least one cooling-passage opening which is connected to a cooling passage running inside the component, is developed in such a manner that, during the coating, a mass flow passes through the cooling-passage opening. This mass flow prevents the cooling-passage opening from being closed up during the coating operation as a result of the material which is to be deposited on the surface being effectively blown away at least within the area of the cooling-passage opening. Furthermore, the process according to the invention provides for the deliberate use of an anisotropic coating technique as a result of a targeted coating mass flow, i.e. a coating mass flow which has a preferred propagation direction, being directed onto the surface which is to be coated. Thermal flame spraying processes which are known per se are particularly suitable for this purpose, allowing the production of protection layers consisting of MCrAlY or TBC materials. Finally, in the process according to the invention the coating is to be carried out in such a manner that the mass flow which emerges through the cooling-passage opening and the coating mass flow include an angle $\alpha \neq 0°$.

The invention makes use of the idea of supplying air through the cooling-passage system in the interior of the temperature-stable component during the coating operation, which substantially involves depositing material on the surface which is provided with the cooling-passage openings, so that the air which flows out through the cooling-passage openings prevents the coating material which is being deposited on the surface from blocking the cooling-passage openings. In this way, components, preferably gas turbine blades or vanes, which have already been produced with a fully-formed cooling system with cooling-passage opening, to be subjected to a coating process which is able to coat the entire component surface which is provided with cooling-passage openings in a single coating step. There is no need for preparatory measures aimed at keeping the holes open beforehand at the surface of the component which is to be coated, and nor is there any need for remachining steps to open the holes up again after the coating operation.

However, the inventive idea goes still further, since the method of coating in which the mass flow emerging through the cooling-passage opening is inclined with respect to the coating mass flow leads to a characteristic coating shadow, which preferably unidirectionally adjoins the cooling-passage opening.

The coating shadow, which is dealt with in more detail with reference to the figures which follow, has the effect that layer material locally fails to reach the surface which is to be coated on account of the locally deflecting action of the mass flow on the coating mass flow. As a result of such coating, a recess, which is in the shape of an elliptical crater, remains within the protection layer, around the cooling-passage opening, the cooling-passage opening being arranged eccentrically with respect to the elliptical shape of the recess. This ultimately leads to the recess, which is in the shape of an elliptical crater, within the protection layer having a diffuser-like action on the cooling air emerging through the cooling-passage opening, with the result that the surface-cooling action of the cooling air on the component itself is decisively improved. This aspect will be dealt with in more detail in conjunction with the further exemplary embodiments and with reference to the drawings.

In principle, deliberately to prevent material being deposited in the region of the cooling passage openings, it is irrelevant whether the mass flow, for example in the form of an air flow, is directed through the cooling passage from the inside through the cooling-passage outlet opening toward the outside, or vice versa. Since the coating operation is generally carried out under standard pressure conditions, it is merely necessary to ensure that a mass flow which is directed from the inside outward provides a flow velocity which is sufficiently high deliberately to prevent material from being deposited in the region of the cooling-passage opening.

It is also possible, by suitable application of a vacuum to the cooling passage, to achieve a sucking action in the region of the cooling-passage opening, by means of which any coating material which does reach the region of the cooling-passage opening during the coating is sucked out through the cooling passage itself. Furthermore, in this case it should be ensured that the suction flow through the cooling passage is selected to be sufficiently high for there to be no deposition of material on the inner walls of the cooling-passage system either.

As has already been mentioned above, the mass flow which is maintained through the cooling passage during the coating can be produced by means of an air flow. In principle, it is also possible to use further gases, such as for example gaseous nitrogen or noble gases or mixtures thereof.

To allow the coating operation according to the invention which has been outlined above to be carried out as easily as possible, for example for rotor blades and guide vanes for gas turbines, the invention provides a device for coating precisely these temperature-stable components, which device provides a connection structure to which the component which is to be coated can be fixed releasably by means of a flange. The connection structure provides for the component which is to be coated to be connected in a fluid-tight manner to a vacuum or pressure source, so that a mass flow can be deliberately applied to the cooling-passage system which is present in the component via this vacuum or pressure source. Then, depending on the pressure setting in the vacuum or pressure source, a mass flow is directed from the inside outward or vice versa to the component through the cooling-passage openings. An anisotropic coating source, which is known per se and is preferably designed as a spray-coating source, for example in the form of a flame spray gun, ensures that material is deposited over the entire surface of the temperature-stable component which is exposed to the coating source with the exception of the cooling-passage openings and the regions in the flow or coating shadow which are to be kept clear by the mass flow.

BRIEF DESCRIPTIONS OF THE INVENTION

Figure 2:
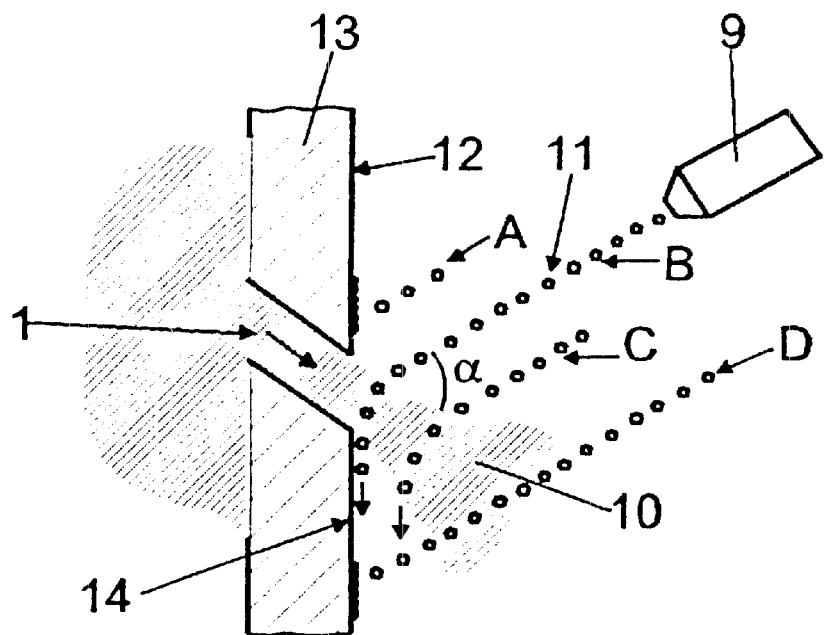
Figure 3:
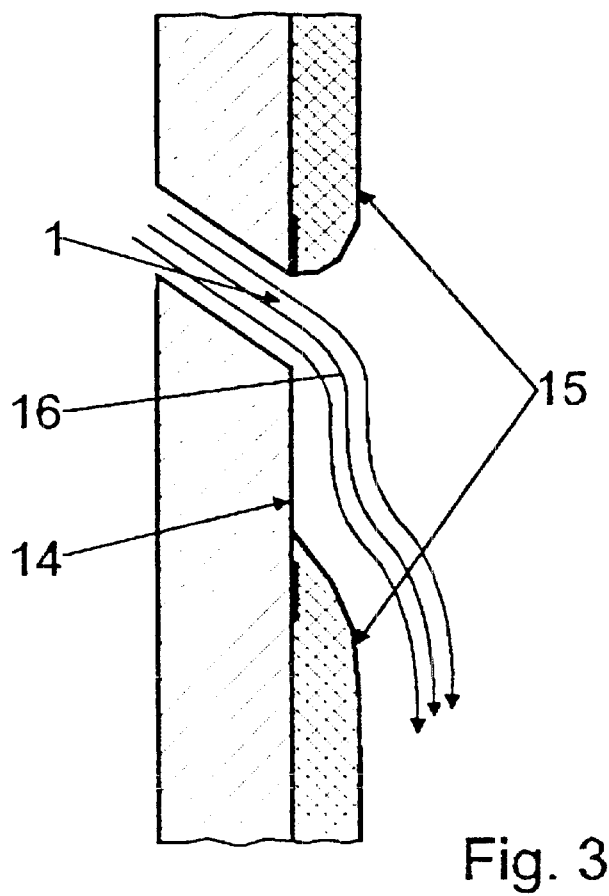
Figure 4A:
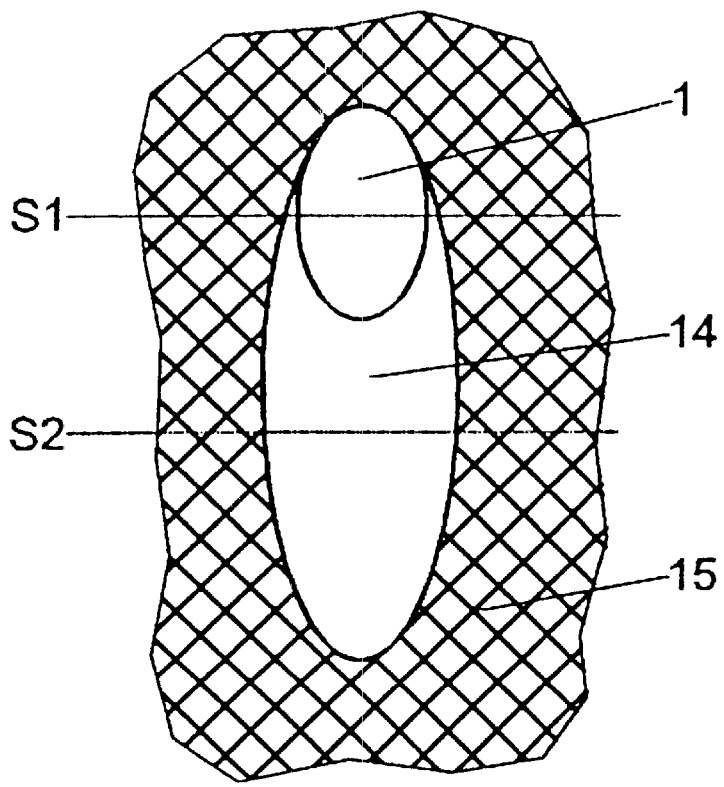
Figure 4B:
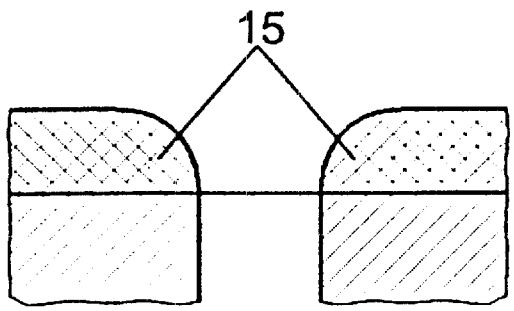
Figure 4C:
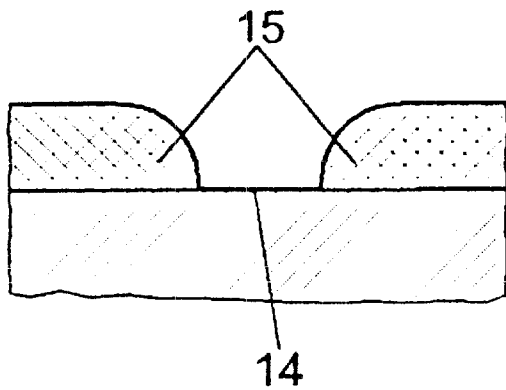

The invention is described below by way of example, and without restriction to the general idea of the invention, on the basis of exemplary embodiments and with reference to the drawings, in which:

FIG. 1 shows an arrangement for coating a gas turbine guide vane which is provided with cooling-passage openings, FIG. 2 shows a cross-sectional drawing for illustrating the coating operation, FIG. 3 shows a cross-sectional drawing through the cooling-passage opening with protection layer, and FIG. 4 shows the recess, which is in the shape of an elliptical crater, around a cooling-passage opening.

WAYS OF CARRYING OUT THE INVENTION, INDUSTRIAL APPLICABILITY

FIG. 1 shows a turbine guide vane 2 which is provided with cooling-passage openings 1 and the guide-vane root 3 of which opens out into a connection structure 4. The connection structure 4 has a cover element 6, which is connected in a gastight manner to a baseplate 5 and surrounds a releasably fixed attachment structure 7 for the guide-vane root 3. In addition, a feed line 8, to which a vacuum and pressure source (not shown) is connected, opens out through the cover element 6. Then, superatmospheric pressure or vacuum can be generated within the cover element 6 through the feed line 8, and this superatmospheric pressure or vacuum is passed on through the cooling passages which are located in the interior of the guide vane 2 and open out at the cooling-passage openings 1. In the case of a targeted supply of air through the feed line 8 into the interior of the cover element 6, an air mass flow 10 emerges via the multiplicity of cooling-passage openings 1 and in this way is responsible for a targeted mass flow 10 through the cooling-passage openings 1. The coating operation is carried out using a spraying device 9 which is arranged in the region of the turbine guide vane 2 which is to be coated and generates a preferably unidirectional spray jet, the so-called coating mass flow 11, which comes into contact with the mass flows 10 emerging from the cooling-passage openings 1 at an angle α.

To allow rapid changing of the guide vanes 2 which are to be coated, the cover element 6 is releasably fixed to the baseplate 5, so that the guide vanes 2 can be exchanged rapidly. Of course, it is also possible for a multiplicity of guide vanes 2 to be integrated in series or in parallel in one connection structure as shown in FIG. 1a, so that it is possible for a multiplicity of guide vanes to be coated simultaneously.

FIG. 2 shows a cross-sectional illustration through the outer wall 13 of a component, for example a guide vane or rotor blade, through which a cooling-passage opening 1 passes. Air flows outward from the inside of the component through the cooling-passage opening 1, and outside the component forms a directed mass flow 10.

An anisotropic coating source 9, for example a flame spray gun, from which the coating mass flow 11 emerges at a predeterminable angle α onto the mass flow 10, is provided for the purpose of coating the surface 12 of the component. The predeterminable angle α is to be selected to be other than 0°, preferably 0°<α<180°.

With the coating constellation illustrated in FIG. 2, the coating mass flow A comes into contact with the surface 12 without being influenced, so that in this region the deposition of protection layer on the surface 12 is unaffected.

To prevent coating material from entering the cooling-passage opening 1, it should be ensured that the velocity at which the mass flow 10 emerges from the cooling-passage opening 1 is selected in such a manner that coating particles from the coating source 9 which move along orbit B are reliably diverted before they penetrate into the cooling-passage opening 1. However, this also means that coating particles which follow orbit C are likewise diverted, in the manner illustrated in FIG. 2, directly above the cooling-passage opening 1. Therefore, in the region 14 a spray shadow or coating shadow, i.e. a surface region which directly adjoins the cooling-passage opening 1 and has not been coated, is formed. By contrast, coating particles which follow orbit D are only slightly diverted or are not diverted at all, since in this region the mass flow 10 has lost a considerable proportion of its flow velocity. In the same way as the orbit A, the coating mass flow D reaches the surface 12 which is to be coated virtually without being influenced.

FIG. 3 shows the result of coating after the coating operation has been completed. The protective coating 15 which has been formed by the coating operation on one side directly adjoins the cooling-passage opening 1 above it but on the other side, below the cooling-passage opening 1, is spaced apart from the opening by the region 14 which corresponds to the coating shadow.

For a cooling-air flow 16 which passes through the cooling-passage opening 1, the outlet contour of the recess within the protection layer 15 produces a type of diffuser action, with the result that the cooling air 16 is firstly diverted along the component surface and secondly accelerated. This considerably increases the cooling effect.

FIG. 4a shows a plan view of the cooling-passage outlet opening 1 which is surrounded by the protection layer 15. On account of the coating shadow explained above, a recess, which is in the shape of an elliptical crater, is formed within the protection layer 15 adjacent to the cooling-passage opening 1. FIGS. 4b and c show corresponding sectional drawings on section lines S1 and S2.

The shape and size of the recess 14 which has not been coated is responsible for distributing the cooling air which emerges from the cooling-passage opening 1 in a suitable way over the surface, in order to produce a film-cooling effect. On account of the particularly good cooling action immediately after the cooling air emerges from the cooling-passage opening 1, there is no need for additional coating to be applied within the recess.

| List of reference symbols | |
|---|---|
| 1 | Cooling-passage openings |
| 2 | Guide vane |
| 3 | Guide-vane root |
| 4 | Connection structure |
| 5 | Baseplate |
| 6 | Cover plate |
| 7 | Attachment structure |
| 8 | Feed line |
| 9 | Coating source |
| 10 | Mass flow |
| 11 | Coating mass flow |
| 12 | Surface to be coated |
| 13 | Outer wall |
| 14 | Recess, coating shadow |
| 15 | Protection layer |
| 16 | Cooling air |

What is claimed is:

1. A process for coating a temperature-stable component with a thermal protection layer, in which the temperature-stable component has a surface which is to be coated with the thermal protection layer and at which there is at least one cooling-passage opening which is connected to a cooling passage running inside the component, comprising:
   directing a coating mass flow onto the surface which is to be coated;
   directing a mass flow through the cooling passage opening during the step of directing a coating mass flow; and
   emerging the mass flow through the cooling-passage opening and the coating mass flow at an included angle α≠0°;
   wherein the steps of directing a mass flow and of directing a coating mass flow comprise directing; the flow velocities of the mass flow and of the coating mass so that the coating mass flow is prevented from penetrating into the cooling passage, and the coating mass flow is diverted as it passes through the mass flow at least in the vicinity of the cooling-passage opening; and
   wherein the diversion of the coating mass flow by the mass flow further comprises the step of leaving a limited surface region of the surface which is to be coated directing adjacent to the cool jug-passage opening uncoated to form a coating shadow.

2. The process as claimed in claim 1, wherein the step of emerging the mass flow and the coating mass flow further comprises keeping the angle α fixed throughout the entire coating operation.

3. The process as claimed in claim 1, wherein the step of emerging the mass flow and the coating mass flow further comprises varying the angle α over the course of time throughout the entire coating operation.

4. The process as claimed in claim 1, wherein the step of directing a mass flow comprises directing a gaseous mass flow through the cooling passage from inside the temperature-stable component and through the cooling-passage opening toward the outside of the temperature-stable component.

5. The process as claimed in claim 1, wherein the step of coating the surface of the temperature-stable component further comprises spray deposition.

6. The process as claimed in claim 5, wherein the spray deposition is selected from the group consisting of thermal flame spraying and plasma flame spraying.

7. The process as claimed in claim 1, wherein the gas used for mass flow is selected from the group consisting of air, gaseous nitrogen, noble gas, and steam.

8. The process as claimed in claim 1, wherein the stable component further comprises a cooled gas turbine component selected from the group consisting of a gas turbine blade and a gas turbine vane.

9. The process as claimed in claim 1, wherein the step of emerging the mass flow comprises continuously emerging the mass flow through the cooling-passage opening.

* * * * *